United States Patent [19]

Cox

[11] B 3,925,258

[45] Dec. 9, 1975

[54] METHOD FOR ACTIVATING A CATALYST

[75] Inventor: Ralph Cox, Pasadena, Tex.

[73] Assignee: Phillips Petroleum Company, Bartlesville, Okla.

[22] Filed: Mar. 2, 1973

[21] Appl. No.: 337,409

[44] Published under the Trial Voluntary Protest Program on January 28, 1975 as document no. B 337,409.

[52] U.S. Cl. ............... 252/467; 252/411; 252/416
[51] Int. Cl.² ....................................... B01J 23/16
[58] Field of Search ......................... 252/467, 410

[56] References Cited
UNITED STATES PATENTS

| | | | |
|---|---|---|---|
| 2,825,721 | 3/1958 | Hogan et al. | 260/683.15 R |
| 2,985,597 | 5/1961 | Dye et al. | 252/467 |
| 2,987,487 | 6/1961 | Stevens et al. | 252/467 |
| 3,526,601 | 9/1970 | Fotis et al. | 252/467 X |

Primary Examiner—William J. Shine
Attorney, Agent, or Firm—Quigg and Oberlin

[57] ABSTRACT

A method of activating a catalyst by controllably passing a heated fluid stream at a preselected rate through the catalyst positioned in a heating zone and to a first location, measuring the pressure of the fluid stream at one of the heating zone or a location downstream of the heating zone, and passing at least a portion of the fluid stream discharging from the heating zone to a second location in response to the measured pressure being greater than a preselected value.

11 Claims, 2 Drawing Figures

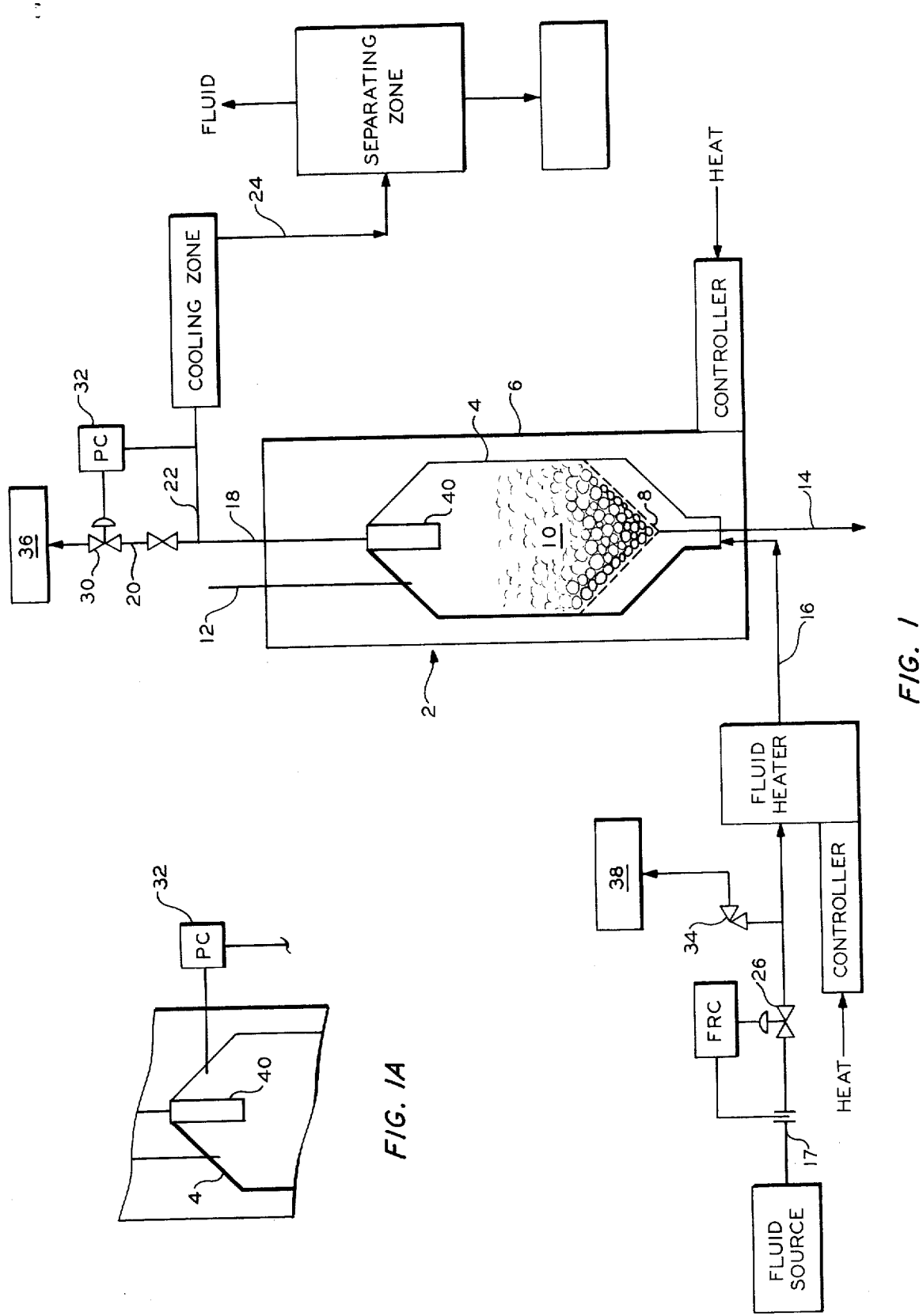

METHOD FOR ACTIVATING A CATALYST

In the activation of catalysts, a heated fluid, for example dry air, is controllably passed through the catalyst to heat the catalyst to a preselected elevated temperature and hold the catalyst at this elevated temperature for several hours in order to impart catalytic activity to the catalyst. The air discharging from the heating zone is at a relatively high temperature and often has a volume of entrained catalyst fines.

Owing to the physical properties of the catalyst and the catalyst fines, and the configuration of the process equipment, the operating conditions sometimes permits the buildup of catalyst particles within the equipment which has the adverse effect of causing an increase in pressure within the heating zone and a decrease in the flow rate of fluid through the catalyst in the heating zone. In response to this change in operating conditions, the catalyst being activated in not desirably maintained below a preselected elevated temperature which can result in the activity of the catalyst being decreased or impaired.

Owing to the fact that catalyst is often expensive and considerable labor expenditure and lost time results when catalyst is ruined and must be removed from the activator and replaced, these undesirable operating conditions cause waste.

This invention therefore resides in a method of activating catalyst by passing a heated fluid stream at a preselected rate through the catalyst positioned in a heating zone, discharging the fluid stream to a first location, measuring the pressure of the fluid stream at the heating zone or a location downstream of the heating zone, and passing at least a portion of the fluid stream discharging from the heating zone to a second location in response to the measured pressure being greater than a first preselected value.

In accordance with a presently preferred embodiment of this invention, the stream discharging from the heating zone is passed into a cooling zone which is maintained at about the pressure of the heating zone.

Other aspect objects, and advantages of the present invention will become apparent from a study of the disclosure, the appended claims, and the drawing.

The drawing is a diagrammatic view of example catalyst activating equipment of this invention. FIG. 1 shows the activating equipment and FIG. 1A shows another embodiment of a portion of the equipment of FIG. 1.

Referring to the drawing, a heating zone 2 for a batch-type activator, for example, has an inner vessel 4 suspended within a refractory lined outer jacket 6 and is controllably heated by gases passing about the inner vessel 4 within the jacket 6. It should be understood that this invention can also be used in continuous activating equipment.

A catalyst bed support plate-air distributor 8 is positioned within the inner vessel 4 for maintaining the catalyst 10 therein in a fluidized state and uniformly distributing and directing heated fluid across the bottom of the catalyst 10. Lines 12 and 14 are associated with the inner vessel for passing catalyst 10 thereinto and recovering catalyst 10 therefrom.

Fluid, for example dry air, is heated to a controlled preselected temperature in a fluid heater and passed via line 16 into the inner vessel 4 via the support-distributor plate 8. The heated fluid passes substantially uniformly through the catalyst 10 while fluidizing said catalyst discharging from heating zone 2 via line 18 which is connected in fluid communication with line 20 and to a first location, for example, a cooling zone, via line 22. The cooling zone is connected to a separating zone via line 24.

A control valve 26 is positioned in the fluid stream for maintaining the rate of flow of the heated fluid stream into the inner vessel 4 at controlled, preselected rate. Valve 26 is manipulated by a controller in response to a measurement of flow in pipe 17 by an orifice.

A control valve 30 is positioned in line 20 and is associated with a pressure measuring-controlling element 32 which is in communication with one of line 22 downstream of the heating zone or with the inner vessel 4 of the heating zone 2, as shown in FIG. 1A.

A pressure control or relief valve 34 is positioned in line 17 at a location downstream of valve 26. Valve 30 is normally closed and at least partially opens in response to a pressure measured by element 32 being greater than a first preselected value, for example 3 psig. Valve 34 is normally closed and at least partially opens in response to a pressure in line 17 being greater than a second preselected value. The second preselected value is, for example, 5 psig and is greater than said first preselected pressure.

In the open or partially open position of valve 30, at least a portion of the fluid stream discharging from the heating zone is passed to a second location 36, for example, to fluid recovery means or to the atmosphere. In the open or partially open position of valve 34, at least a portion of the fluid stream passing to the heating zone is passed to a third location 38 for example, to fluid recovery means or to the atmosphere.

Valves 30 and 34 can be completely opened in response to their preset maximum pressure or each opened an amount relative to the value of its associated measured pressure being above its preselected pressure.

In the method of this invention, catalyst 10 is positioned in the inner vessel 4 and said catalyst is controllably heated by gases passing about the inner vessel 4 and by a heated fluid stream passing at a preselected pressure and a controlled temperature from the fluid heater and through the catalyst 10 via support-distributor plate 8.

The fluid passing through the catalyst 10 is discharged from the heating zone 2 and is passed to a first location, for example, the cooling zone via lines 18 and 22.

The cooling zone is maintained at a pressure of about the pressure of the fluid within the inner vessel 4 and is preferably constructed to cool the fluid to a temperature less than about 600°F.

The cooled fluid is thereafter preferably passed to a separating zone at which location catalyst fines entrained in the fluid are separated and recovered. The separating zone can be comprised of a bag filter. In order to further reduce the fines entrained in the fluid stream and maintain the larger catalyst particles in the inner vessel, a cyclone separator 40 can be positioned within the inner vessel 4.

The pressure of the fluid stream at the heating zone or at a location downstream of the heating zone, for example, in line 22, is measured by pressure measuring-controlling element 32.

As the activation of the catalyst continues, entrained fines or equipment malfunction may cause the system to become plugged and the pressure, as measured by element 32, to increase. In this event, the volume of heated fluid passing through the catalyst is decreased and damage to the catalyst may result.

Since the heated fluid stream is being delivered into the inner vessel at a preselected rate, the amount of pressure increase is a function of the amount of fluid passing through the catalyst. The first preselected pressure or pressure set point of controller 32 is therefore a preselected value below which the volume of a fluid passing through the catalyst will not cause damage to the catalyst.

As the volume of fluid discharging from the inner vessel 4 decreases because of pluggage of a cooling zone or separator 40, for example, the pressure as measured by element 32 will increase to a value greater than the first preselected pressure, valve 30 will at least partially open and sufficient fluid will be passed through line 20 to compensate for the restriction downstream and permit sufficient fluid to pass through the catalyst 10 to prevent damage to said catalyst 10. Thus, a controlled flow of fluid is maintained through the catalyst.

If, however, the restriction becomes more severe or the passage of fluid through lines 20 and 22 is of a rate insufficient to prevent pressure increase to a second preselected value, valve 34 is actuated to open and thereby prevent structural damage to the catalyst activating apparatus.

In an example operation, 600 pounds of chromium oxide containing catalyst as described in U.S. Pat. No. 2,825,721 is positioned in the inner vessel 4 and heated dry air is passed through the catalyst 10 at a rate in the range of about 15 to about 175 SCFM, preferably about 100 SCFM. The catalyst is controllably heated therein from ambient conditions to the desired temperature for this catalyst, for example 1,700°F. In this example of operation, the heated air passing through the catalyst has a temperature in the range of 200° to 1,850°F, preferably 1,700°F. The catalyst is held at 1,700°F for a period of 6 hours, then cooled to about 100°F by passage of cool, dry air therethrough and is then ready for usage.

Catalyst particles are separated from the air stream by the internal cyclone 40 and the air stream, with some catalyst fines therein, is discharged through lines 18, 22, and into the cooling zone wherein the temperature of the air is lowered to a temperature in the range of 800°F or less, for example, 400°F. From the cooling zone, the air stream is passed into a separating zone where catalyst fines are separated and recovered therefrom.

In this example operation, the first preselected pressure value of controller 32 is 3 psig and the second preselected pressure value of relief valve 34 is 5 psig. At 3 psig, valve 32 fully opens and at 5 psig valve 34 fully opens.

As catalyst fines begin accumulating in the separating zone and restricting air flow therethrough, for example, the pressure as measured by element 32 increases from the example 1 psig operating pressure of the inner vessel 4 to a value greater than the 3 psig which causes valve 30 to open and discharge at least a portion of the air stream discharging from heating zone 2. Thereafter, the air passing through the cooling zone and valve 30 is thereby controlled to maintain an air flow through the catalyst at a rate in the range of about 15 to 175 SCFM, preferably at 100 SCFM, and thereby prevent damage to the catalyst until the restriction can be removed.

Where the air restriction to flow occurs upstream of the pressure tap of element 32, for example, in line 16, or where the pressure continues to rise in the vessel 4 to the second preselected pressure value of valve 34, for example, 5 psig, valve 34 is caused to open and pass air from the system in order to prevent the pressure rating of the low pressure activating equipment from being exceeded with resulting rupturing of vessel 4, for example.

By so activating catalyst by the method of this invention, the catalyst is prevented from being damaged by excessive heat in the inner vessel 4 and the activating equipment is prevented from being damaged by excessive pressure being subjected upon that equipment.

Other modifications and alterations of this invention will become apparent to those skilled in the art from the foregoing discussion and accompanying drawing, and it should be understood that this invention is not to be unduly limited thereto.

What is claimed is:

1. In a method for activating a catalyst comprising controllably passing a heated fluid stream at a preselected rate through a catalyst positioned in a heating zone, discharging the fluid stream from the heating zone and passing said fluid stream to a first location, the improvement consisting of
   a. measuring the pressure of the heated fluid at the heating zone or downstream thereof, and
   b. passing at least a portion of said heated fluid discharging from said heating zone to a second location when said measured pressure has reached a first preselected value.

2. A method, as set forth in claim 1, including measuring the pressure of the fluid stream at a location upstream of the heating zone; and,
   passing at least a portion of the fluid stream upstream of the heating zone to a third location in response to the pressure upstream of the heating zone being greater than a second preselected value, said second preselected value being greater than said first preselected value.

3. A method, as set forth in claim 2, wherein the first preselected pressure is not greater than 3 psig and the second preselected pressure is not less than 5 psig.

4. A method, as set forth in claim 1, wherein the catalyst is a supported chromium oxide catalyst and the fluid is air.

5. A method, as set forth in claim 1, wherein the heated fluid passing through the catalyst is in the range of about 200° to about 1,850°F.

6. A method, as set forth in claim 2, wherein the heated fluid is passed through the catalyst at a rate in the range of about 15 to about 175 SCFM in response to the pressure of the first stream at the heating zone or a location downstream of the heating zone being greater than the first preselected value and less than about 5 psig.

7. A method, as set forth in claim 1, including passing the fluid stream discharging from the heating zone into a cooling zone, said cooling zone being maintained at about the pressure of the heating zone.

8. A method, as set forth in claim 7, including passing the cooled fluid from the cooling zone into a separating zone; and, separating and recovering entrained catalyst fines from the fluid.

9. A method, as set forth in claim 1, wherein substantially all of the fluid stream discharging from the heating zone is passed to the second location in response to the measured pressure being greater than the first preselected value.

10. A method as set forth in claim 4, wherein the heated fluid passing through the catalyst is in the range of about 200° to about 1,850°F and the heated fluid is passed through the catalyst at a rate in the range of about 15 to about 175 SCFM in response to the pressure of the fluid stream at one of the heating zone or a location downstream of the heating zone being greater than the first preselected value and less than about 5 psig.

11. A method, as set forth in claim 10, including passing the fluid stream discharging from the heating zone into a cooling zone, said cooling zone being maintained at about the pressure of the heating zone;

passing the cooled fluid from the cooling zone into a separating zone; and, separating and recovering entrained catalyst fines from the fluid.

* * * * *